United States Patent [19]

Drake

[11] Patent Number: 5,618,329
[45] Date of Patent: Apr. 8, 1997

[54] BIOREMEDIATION OF HYDROCARBON CONTAMINATED SOILS AND WATER

[75] Inventor: Evelyn N. Drake, Bernardsville, N.J.

[73] Assignee: Exxon Research and Engineering Company, Florham Park, N.J.

[21] Appl. No.: 515,552

[22] Filed: Aug. 16, 1995

Related U.S. Application Data

[63] Continuation of Ser. No. 125,059, Sep. 21, 1993, abandoned.

[51] Int. Cl.$^6$ ................ C05G 3/00; C05F 11/08
[52] U.S. Cl. ................ 71/6; 71/28; 71/64.07; 71/64.11; 71/903; 71/904
[58] Field of Search ................ 71/6, 8, 28–30, 71/903, 904, 64.07, 64.11, 64.13

[56] References Cited

U.S. PATENT DOCUMENTS

| | | | |
|---|---|---|---|
| 4,369,055 | 1/1983 | Fujita | 71/64.11 |
| 5,219,465 | 6/1993 | Goertz et al. | 71/28 |
| 5,256,181 | 10/1993 | Manalastas et al. | 71/28 |
| 5,340,376 | 8/1994 | Cunningham | 71/6 |

*Primary Examiner*—Ferris Lander
*Attorney, Agent, or Firm*—Joseph J. Dvorak; Jay Simon

[57] ABSTRACT

The present invention provides an enhanced biodegradation process by applying to petroleum contaminated soil or water essential microbial nutrients in a form capable of releasing the nutrients over time at a rate which, at 25° C., is substantially linear. Importantly, in a preferred embodiment of the present invention, the microbial nutrients that are applied to the soil or water are in a form such that the release of nutrients at 38° C. will be greater than that at 25° C. by a factor of about 2.5 to 6.0, and preferably from a factor of about 3 to about 5.0.

3 Claims, 4 Drawing Sheets

5,618,329

BIOREMEDIATION OF HYDROCARBON CONTAMINATED SOILS AND WATER

This is a continuation, of application Ser. No. 125,059, filed Sep. 21, 1993 and now abandoned.

FIELD OF THE INVENTION

The present invention relates to improvements in the bioremediation of hydrocarbon contaminated soils and water, and more particularly, to improvements in stimulating microbial biodegradation of hydrocarbon contaminants.

BACKGROUND OF THE INVENTION

It is well known that many naturally occurring microorganisms are capable of biodegradating hydrocarbon contaminants found in soils and water. Unfortunately, these naturally occurring microorganisms are not capable of biodegrading the hydrocarbon contaminants at sufficiently rapid rates to be able to render biodegradation as a practical process for depolluting hydrocarbon contaminants from soils and water. One factor believed to be contributing to the relatively slow rate of biodegradation of hydrocarbon contaminants in soils and water by the naturally occurring microflora is lack of adequate microbial nutrients. Therefore, it has been proposed to stimulate the proliferation and activity of hydrocarbon degrading microorganisms by adding nutrients such as nitrogen and phosphorous to the sites requiring bioremediation. Indeed, perhaps the first large scale demonstration of the beneficial effects of microbial stimulation as a means of enhancing natural bioremediation occurred at Prince William Sound in Alaska, following the 1989 oil spill, where a slow release solid fertilizer was applied over many miles of beach to supplement the naturally available nitrogen and phosphorous. Notwithstanding the success of that demonstration, there still remains a need for improving the bioremediation of contaminated soils and water.

Accordingly, it is an object of the present invention to enhance microbial growth and activity by providing contaminated soils and water with nutrients released at a rate which is more consistent with the growth needs of the microflora.

It is another object of the present invention to improve microbial biodegradation of contaminated soils and water by providing the release of microbial nutrients at a rate which more effectively matches the microbial needs under differing temperature conditions.

These and other objects of the present invention will become more apparent upon a reading of the description of the invention which follows:

SUMMARY OF THE INVENTION

Simply stated, the present invention provides an enhanced biodegradation process by applying to petroleum contaminated soil or water essential microbial nutrients in a form capable of releasing the nutrients over time at a rate which, at 25° C., is substantially linear. Importantly, in a preferred embodiment of the present invention, the microbial nutrients that are applied to the soil or water are in a form such that the release of nutrients at 38° C. will be greater than that at 25° C. by a factor of about 2.5 to 6.0, and preferably from a factor of about 3 to about 5.0.

A BRIEF DESCRIPTION OF THE DRAWINGS

DETAILED DESCRIPTION OF THE INVENTION

Figure 1:
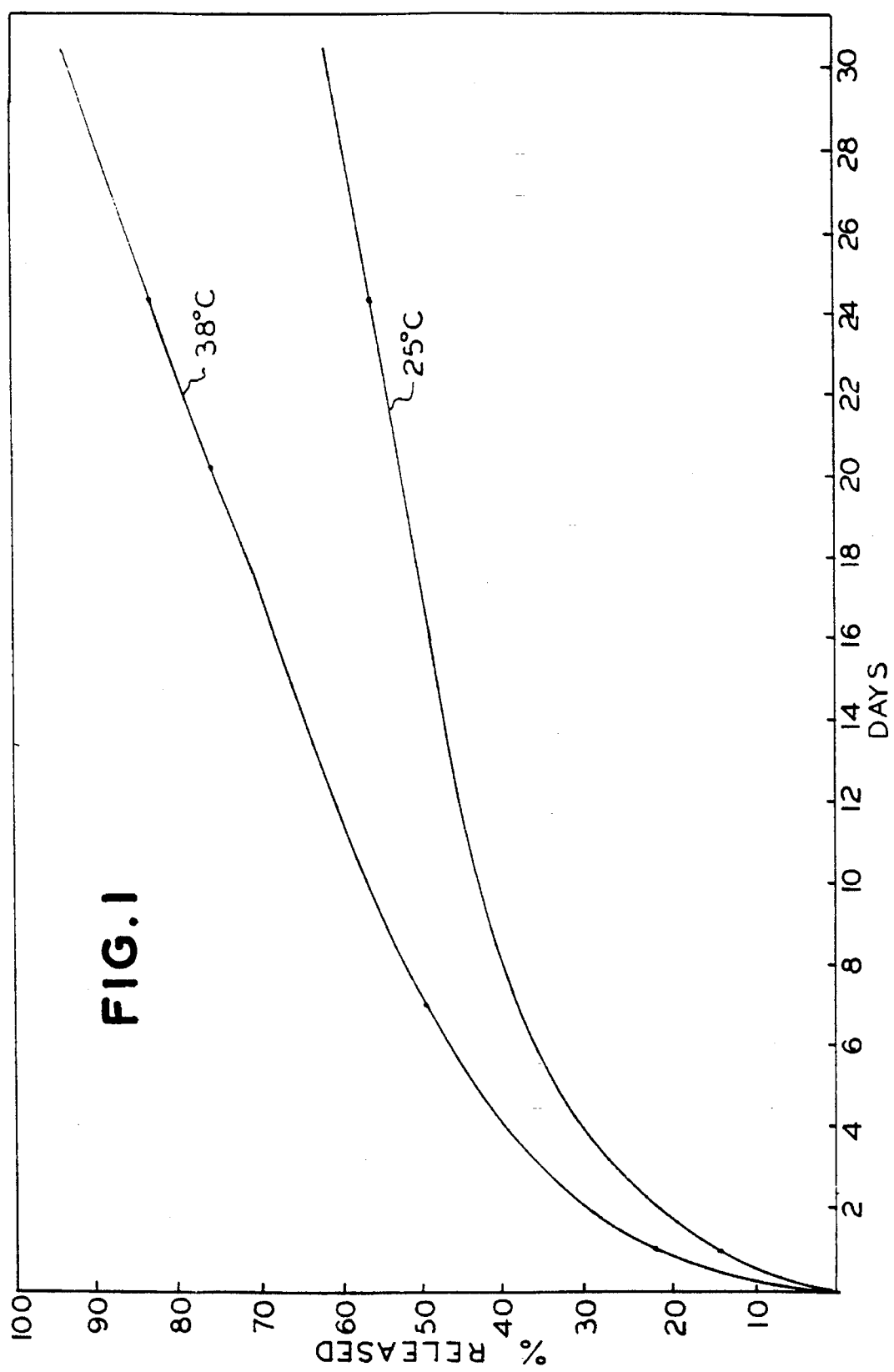
FIG. 1 is a graph showing the release rate at 25° C. and 38° C. of a commercially available, 2 month, control release fertilizer.

In order to stimulate the growth and metabolic activity of hydrocarbon degrading microorganisms, it is necessary to provide these organisms with nutrients such as nitrogen and phosphorous. Additionally, it is particularly desirable to have these nutrients available to the microorganisms over an extended period of time. One method used to achieve that objective is to apply a control release fertilizer to the contaminated environment. As can be seen in FIG. 1, however, typically available control release fertilizers release a substantial amount of their nutrients within a very short period of time. As can be seen from FIG. 1, a fertilizer coated so as to release the substrate over 2 month period released more than half of the fertilizer in the first month and the release rate is greater in first several days. Indeed, because the release rates are significantly high in the early periods of time, there is a limit on how much of the fertilizer can be applied to the contaminated environment since heavy applications will result in detrimental impact on microbial growth. Additionally, as can be seen in FIG. 1, the rate of increase in the release rate at an elevated temperature, i.e., 38° C., is not significantly greater than the release rate at 25° C. Nonetheless, it is well known that the growth rate for naturally occurring petroleum assimilating microorganisms increases by a factor of about 4 to 5 at an increased temperature from 25° C. to 38° C.

Figure 2:
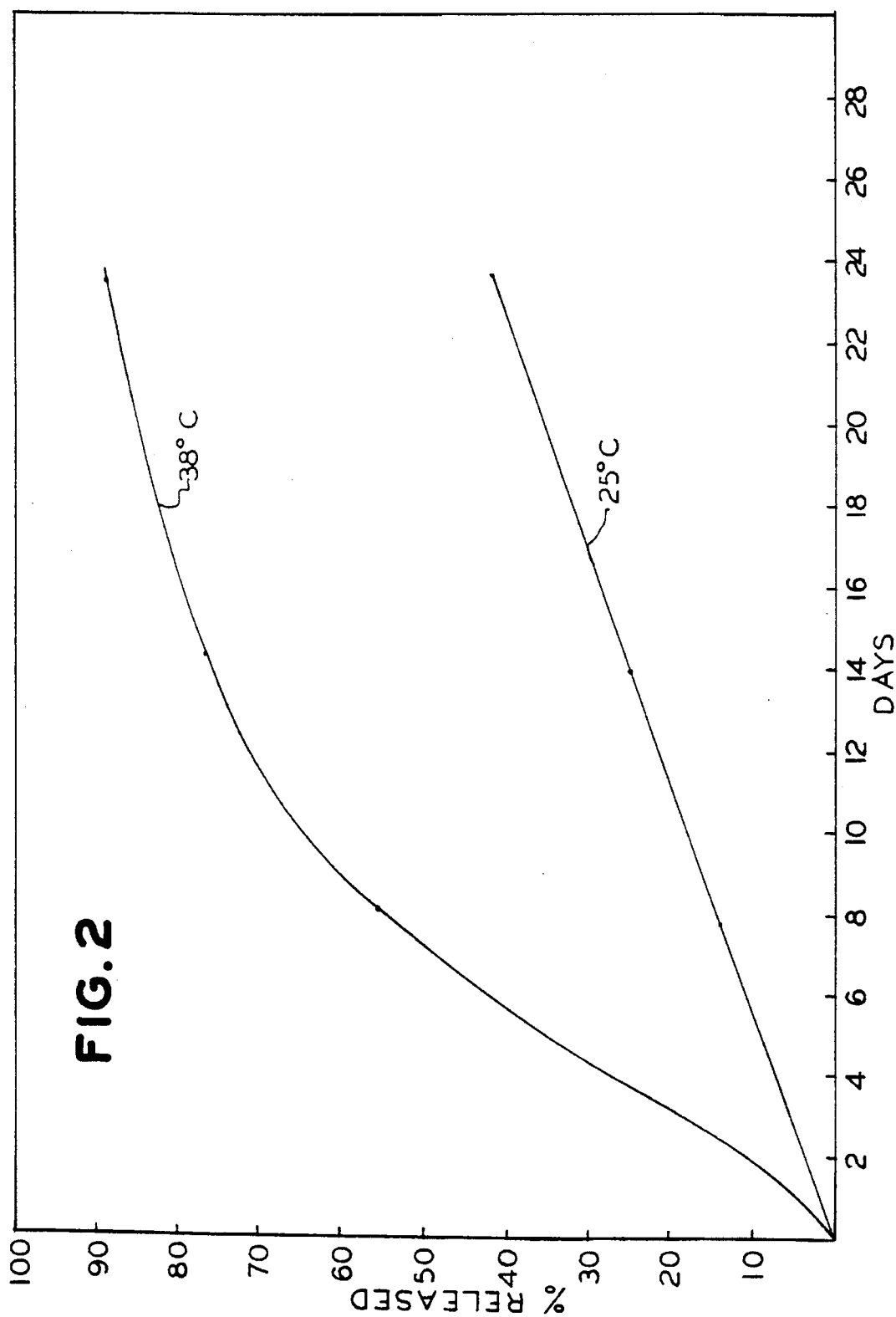
FIG. 2 and FIG. 3 are graphs showing the release rate at 25° C. and 38° C. of a 2 month and a 4 month coated urea fertilizer respectively.

The microbial nutrients employed in the process of the present invention are capable of releasing the nutrients over a sustained period of time, for example 1 to 6 months, at a rate which, at 25° C., is substantially linear. Advantageously the microbial nutrients of the present invention release less than 5% of the nutrients in 1 day. See, for example, FIGS. 1 and 2. Importantly, as can be seen in FIGS. 1 and 2, the nutrients of the present invention are released at 38° C. at a rate greater than that of 25° C. by a factor of at least 2.5 and especially in the range of about 3.0 to 5.0. Thus, the rate of release of the nutrients substantially mirrors that of the control rate of the microorganisms with increasing temperature.

The nutrients of the present invention may include one or more nitrogen sources such as ammonium nitrate, urea and the like, and optionally phosphorous sources such as phosphates. Typically the nitrogen and phosphorous sources will be combined to provide an N:P ratio of about 10:0.1 to about 10:5 and preferably 10:1. The controlled release nutrients may also contain micronutrients such as magnesium, iron, manganese, calcium, and the like. These micronutrients, of course, are optional and if present are generally present at very low levels.

A controlled release nutrient of the present invention generally is one which is coated with a material which controls the release of the nutrient to the environment. The highly preferred coating suitable in the practice of the present invention is an elastomeric sulfonated polymer such as an ethylene-propylene, diene terpolymer (EDPM). Indeed, particularly preferred EDPM coated nutrients are commercially available and described in considerable detail in U.S. Pat. No. 4,988,377 which is incorporated herein by references.

In applying the nutrient to soil or water, an amount sufficient to stimulate microbial growth and activity is added to the soil or water by any suitable means. In general, in treating a soil from about 0.1 to about 500 lbs. of nutrient per cubic yard of soil is used.

The following examples will demonstrate the present invention.

COMPARATIVE EXAMPLE 1

In this experiment the release properties of a commercially available fertilizer was tested. In this instance the fertilizer contained urea encapsulated in a linseed oil-diocyclopentadiene resin. The amount of coating was sufficient to sustain release of the urea over a 2 month period. The test was conducted as follows: 15 grams of the fertilizer was placed in a 250 ml flask, 75 grams of distilled water was added and the mixture was incubated at the selected temperature. At periodic time intervals, the water was decanted from the sample into a weighed aluminum container and placed in a 98° C. oven to dry. After drying and cooling, the aluminum container was weighed and the gain in weight represents the amount of urea released. To the remaining coated material, 75 grams of distilled water was added and the incubation, decantation, etc. was repeated. Repetition of this procedure produced additional data points. These results are shown both in FIG. 1 and in Table 1.

EXAMPLES 1 AND 2

Figure 3:
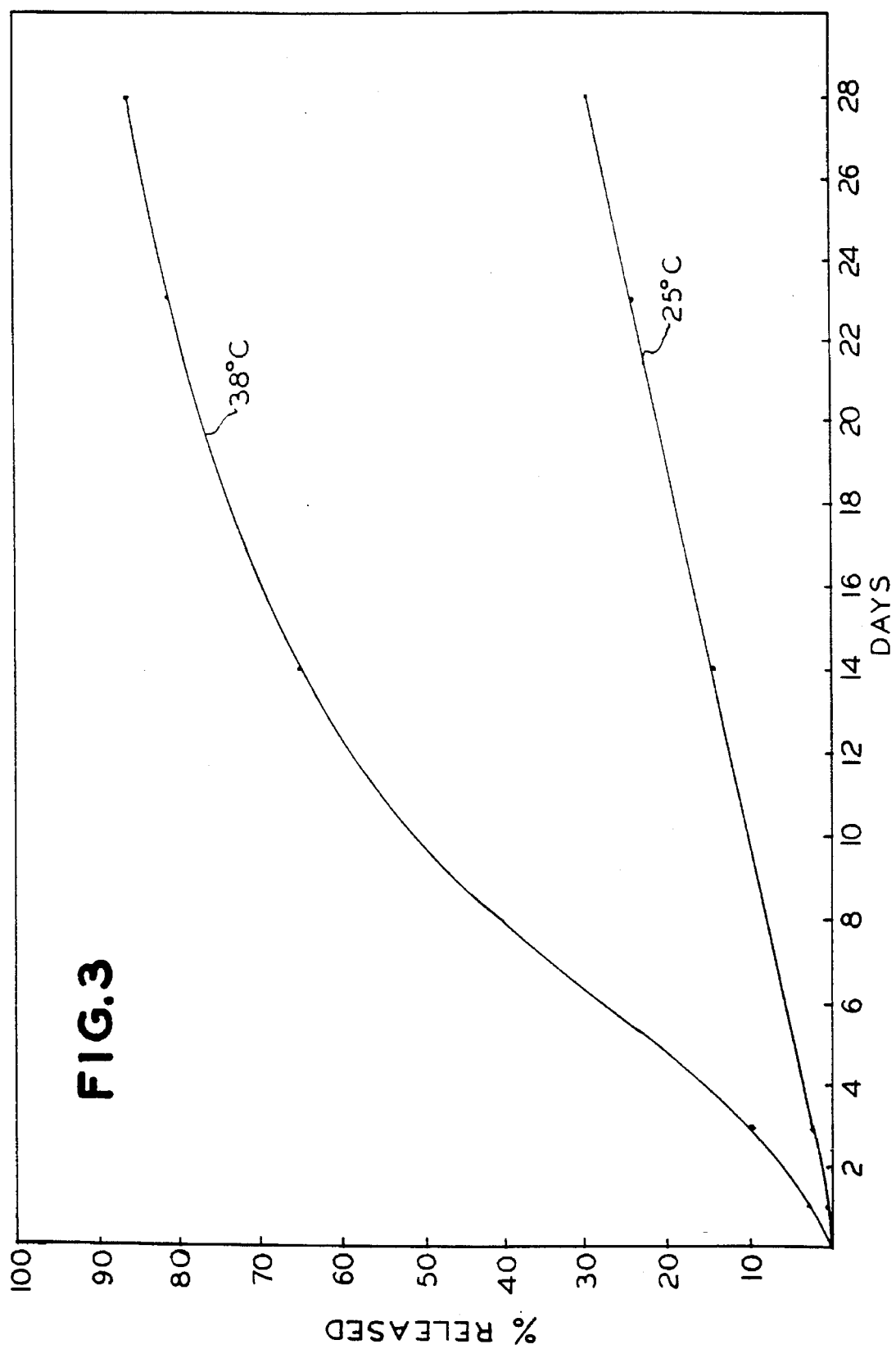

The barrier release properties were measured for two different coated fertilizers (i.e., a 2 month and 4 month coated fertilizer) suitable for use in the practice of the present invention at two different temperatures utilizing the procedure outlined in Comparative Example 1. The release properties were measured and the results are set forth both in FIGS. 2 and 3 as well as in Table 1.

TABLE 1

| Example | Temp. °C. | Wt % Release | | |
|---|---|---|---|---|
| | | 1 Day | 7 Days | 14 Days |
| Comparative 1 | 25° C. | 15 | 38 | 45 |
| | 38° C. | 22 | 50 | 65 |
| Example 1 | 25° C. | 2 | 13 | 26 |
| | 38° C. | 4 | 49 | 77 |
| Example 2 | 25° C. | 1 | 7 | 14 |
| | 38° C. | 3 | 34 | 65 |

Additionally, in Table 2 below there is shown the factor by which the release rate increases with an increasing temperature from 25° to 38° C. for various controlled release fertilizers.

TABLE 2

| | Ratio Wt % Release @ 38°/25° | |
|---|---|---|
| Example | 7 Days | 14 Days |
| Comparative 1 | 1.3 | 1.3 |
| Example 1 | 3.8 | 3.0 |
| Example 2 | 4.9 | 4.6 |

Figure 4:
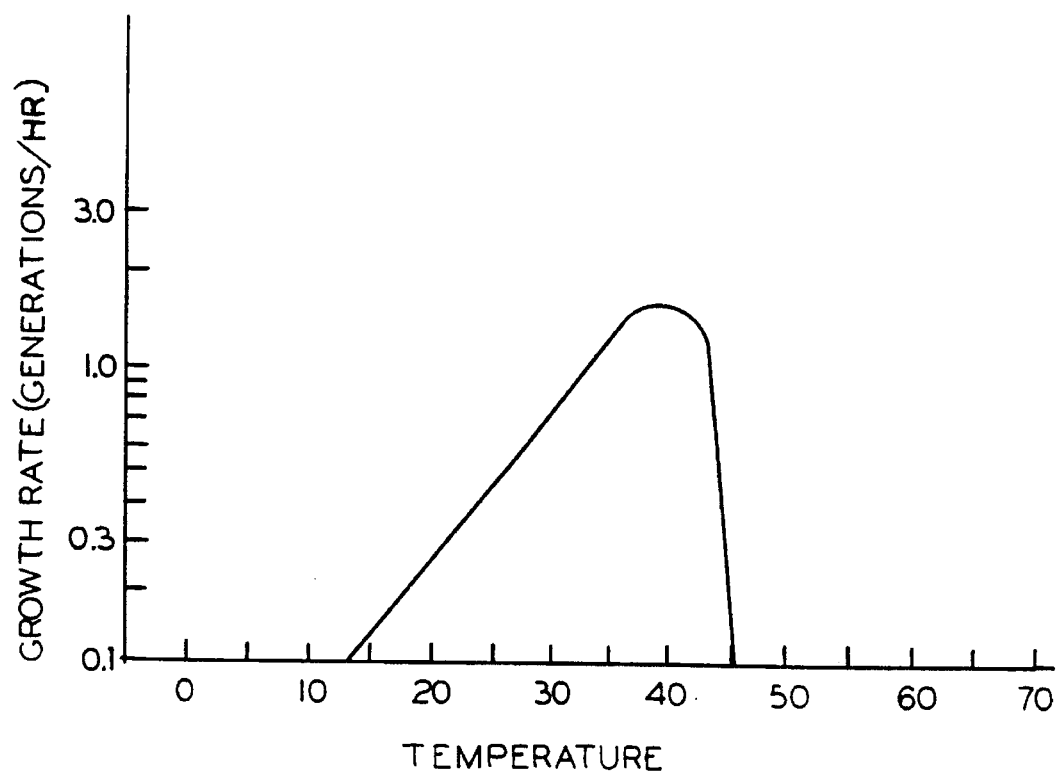
FIG. 4 is a graph showing the growth rate of mesophilic microorganisms as a function of temperature.

Referring to FIG. 4, it can be seen, for example, that the growth rate for mesophilic microorganisms increases by a factor of about 4 at from 25° C. to about 38° C. Hence, the nutrients of the present invention have release rates at different temperatures that more nearly match the growth demands of petroleum assimilating microorganisms.

What is claimed is:

1. An improved process for enhancing bioremediation of petroleum contaminated soil and water comprising:

applying to the contaminated soil or water microbial nutrients coated with a sulfonated ionomer so as to be in a form capable of releasing the nutrients over time at a rate at 25° C. which is substantially linear, which at 38° C. is greater than at 25° C. by a factor of from about 2.5 to about 6.0, and in which less than 5% of the nutrients are released upon incubation in water at 25° C. for one day.

2. The process of claim 1 wherein the factor is from about 3.0 to 5.0.

3. In the bioremediation of hydrocarbon contaminated soils, wherein a controlled release microbial nutrient is applied to the contaminated soil to stimulate microbial growth and activity, the improvement comprising:

applying a nutrient coated with an elastomeric sulfonated ionomer which releases less than 5% of the nutrient upon incubation in water for one day at 25° C. and which is capable of releasing nutrient at 25° C. at a rate over time which is substantially linear and at 38° C. at a rate which is greater than that at 25° C. by a factor of from about 3.0 to 5.0, the nutrient being applied in amounts of from about 0.1 to about 500 lbs. per cubic yard of soil.

* * * * *